United States Patent
Endoh

(10) Patent No.: US 6,188,069 B1
(45) Date of Patent: Feb. 13, 2001

(54) SOLID-STATE IMAGE SENSING DEVICE WITH IMAGE PICK-UP BOLOMETERS FOR NOISE CONTAINING IMAGE SIGNAL AND REFERENCE BOLOMETERS FOR ESTIMATING NOISE AND READ-OUT CIRCUIT FOR PRODUCING NOISE-FREE IMAGE SIGNAL

(75) Inventor: Tsutomu Endoh, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/205,091

(22) Filed: Dec. 3, 1998

(30) Foreign Application Priority Data

Dec. 3, 1997 (JP) ................................... 9-332980

(51) Int. Cl.[7] .................................................. G12B 13/00
(52) U.S. Cl. .................... 250/338.1; 250/332; 250/257.1
(58) Field of Search ................................ 250/338.1, 332, 250/252.1, 370.08, 339.01

(56) References Cited

U.S. PATENT DOCUMENTS

| | | | |
|---|---|---|---|
| 5,656,816 | * 8/1997 | Tanaka | 250/339.01 |
| 5,698,852 | 12/1997 | Tanaka et al. | 250/332 |
| 5,763,885 | * 6/1998 | Murphy et al. | 250/332 |
| 5,952,659 | * 9/1999 | Yoneyama et al. | 250/370.08 |
| 5,965,892 | * 10/1999 | Tanaka | 250/332 |
| 5,994,699 | * 11/1999 | Akagawa | 250/338.1 |
| 6,011,257 | * 1/2000 | Endoh | 250/252.1 |

FOREIGN PATENT DOCUMENTS

| | | |
|---|---|---|
| 2-26867 | 2/1990 | (JP) . |
| 3-29368 | 2/1991 | (JP) . |
| 4-39790 | 4/1992 | (JP) . |
| 5-052659 | 6/1993 | (JP) . |
| 8-105794 | 4/1996 | (JP) . |
| 9-168116 | 6/1997 | (JP) . |
| 9-284651 | 10/1997 | (JP) . |
| 10-023335 | 1/1998 | (JP) . |
| 11-037841 | 2/1999 | (JP) . |

* cited by examiner

Primary Examiner—Constantine Hannaher
Assistant Examiner—Otilia Gabor
(74) Attorney, Agent, or Firm—Foley & Lardner

(57) ABSTRACT

A solid-state infrared image sensing device has an image pick-up pixel array having respective bolometers sequentially connected to a read-out circuit for producing an image carrying signal: However, the image carrying signal contains a fixed pattern noise due to the pattern of the bolometers: In order to produce a first reference signal representative of the standard magnitude of fixed pattern noise and a second reference signal representative of a deviation from the standard magnitude to the magnitude of fixed pattern noise at a selected image pick-up pixel, reference pixels are provided around the image pick-up pixel array.

17 Claims, 7 Drawing Sheets

SOLID-STATE IMAGE SENSING DEVICE WITH IMAGE PICK-UP BOLOMETERS FOR NOISE CONTAINING IMAGE SIGNAL AND REFERENCE BOLOMETERS FOR ESTIMATING NOISE AND READ-OUT CIRCUIT FOR PRODUCING NOISE-FREE IMAGE SIGNAL

FIELD OF THE INVENTION

This invention relates to a solid-state image sensing device and, more particularly, to a solid-state infrared image sensing device having a pixel array implemented by bolometers and a read-out circuit for producing a noise-free image carrying signal.

DESCRIPTION OF THE RELATED ART

A typical example of the solid-state infrared image sensing device is disclosed in Japanese Patent Publication of Unexamined Application No. 8-105794. Bolometers are incorporated in the prior art solid-state infrared image sensing device, and convert an infrared image to an electric image carrying signal. However, the prior art solid-state infrared image sensing device suffers from a fixed pattern noise due to dispersion of resistance between the bolometers.

FIG. 1 illustrates the prior art solid-state infrared image sensing device. The prior art solid-state infrared image sensing device comprises a pixel array 1, a vertical shift register 2, a selector 3 and a horizontal shift register 4. Plural image pick-up pixels PX00, PX01, PX0m, PX0n, PX10, PX11, PX1m, PX1n, PXj0, PXj1, PXjm, PXjn, PXk0, PXk1, PXkm and PXkn are arranged in rows and columns, and form the pixel array 1. The image pick-up pixels PX00 to PXkn are similar in arrangement to one another, and each of the image pick-up pixels PX00 to PXkn is implemented by a series combination of an n-channel enhancement type field effect transistor T1 and a bolometer BM1. The bolometer BM1 is formed of titanium, and varies the resistance together with the temperature thereon. The n-channel enhancement type field effect transistors T1 are grounded through source lines 5. The bolometer BM1 is sensitive to electromagnetic power such as infrared, and varies the resistivity depending upon the magnitude of the incident power.

The columns of image pick-up pixels PX00–PXk0, PX01–PXk1, ... PX0m–PXkm and PX0n–PXkn are associated with vertical signal lines V0, V1, ..., Vm and Vn, respectively, and each of the vertical signal lines V0 to Vn is connected between the bolometers BM1 of the associated column and the selector 3. The rows of image pick-up pixels PX00–PX0n, PX10–PX1n, PXj0–PXjn and PXk0–PXkn are respectively associated with row selecting lines H0, H1, ... Hj and Hk, and each of the row selecting lines H0 to Hk is connected to the gate electrodes of the n-channel enhancement type field effect transistors T1 of the associated row of image pick-up pixels.

The row selecting lines H0 to Hk are connected to the vertical shift register 2, and the vertical shift register 2 sequentially changes the row selecting lines H0 to Hk to active high level, and the bolometers BM1 of each row of image pick-up pixels are concurrently connected through the source lines 5 to the ground.

The selector 3 includes plural transfer gates TG1 connected between the vertical signal lines V0 to Vn and a horizontal signal line 5a and inverters INV1 respectively provided for the transfer gates TG1. Each of the transfer gates TG1 is implemented by a parallel combination of an n-channel enhancement type field effect transistor and a p-channel enhancement type field effect transistor. The horizontal signal line 5a is connected to an output node 6. The horizontal shift register 4 has plural control lines CL0/CL1/CLm and CLn, and sequentially changes the control lines CL0 to CLn to the active level. The control lines CL1 to CLn are respectively associated with the transfer gates TG1. Each control line is directly connected to the gate electrode of the n-channel enhancement type field effect transistor of the associated transfer gate TG1, and is connected through the inverter INV1 to the gate electrode of the p-channel enhancement type field effect transistor of the associated transfer gate TG1. The horizontal shift register 4 sequentially changes the control lines CL0 to CLn to the active level. Thus, the vertical shift register 2 and the horizontal shift register 4 sequentially connect the image pick-up pixels PX00 to PXkn to the output node 6.

When an infrared image falls on the pixel array 1, the bolometers BM1 differently vary the resistance depending upon the intensity dispersion of the infrared image. An external circuit (not shown) applies a predetermined potential level to the output node 6, and the vertical shift register 2, the horizontal shift register 4 and the selector 3 sequentially connect the image pick-up pixels PX00 to PXkn to the output node 6. The potential difference across each bolometer BM1 is read out from the output node 6 to the external circuit as an image carrying signal. The variation of the potential difference is representative of the infrared image.

A problem is encountered in the prior art solid-state image sensing device in that complicated correction circuit is required for eliminating fixed pattern noise. The fixed pattern noise is due to dispersion of resistance among the bolometers BM1. In detail, the bolometers BM1 are fabricated on a diaphragm through an etching process, and two dimensional dispersion takes place in the array of bolometers BM1 due to the microloading effect in the etching process. FIGS. 2A and 2B show the dispersion of resistivity. When the pixel array 1 has corners CR1, CR2, CR3 and CR4 as shown in FIG. 2C, the resistivity inclines in the direction of rows of image pick-up pixels as indicated by plots PL1 without any infrared image, and the resistivity inclines in the direction of columns of image pick-up pixels as indicated by plots PL2 without any infrared image. As a result, the resistivity is two dimensionally dispersed as indicated by plots PL3 over the pixel array 1. The dispersion is causative of the fixed pattern noise. The fixed pattern noise rides on the output image carrying signal, and is supplied to the external circuit together with the signal components representative of the infrared image.

The fixed pattern noise does not allow the output image carrying signal to represent the infrared image, and is serious in the circuit D-range. For this reason, correction is required for the output image carrying signal. A correction circuit is incorporated in the external circuit, and includes an integration circuit, an analog-to-digital converter, a memory, a digital-to-analog converter and a microprocessor. The dispersion of resistance is represented by digital values, and the digital values are stored in the memory.

The image carrying signal is supplied to the integration circuit, and the output signal of the integration circuit is periodically sampled. The sampled values are converted to a series of digital data signals, and the digital data signals are temporarily stored in the memory. The digital values are subtracted from the values of the sampled values, respectively. As a result, the fixed pattern noise is eliminated from the image carrying signal. After the subtraction, the digital signals are supplied to the digital-to-analog converter, and are formed into an image carrying signal without the fixed pattern noise. Thus, the prior art correction circuit eliminates the fixed pattern noise inherent in the bolometer array from the output image carrying signal. However, the prior art correction circuit is so complicated that the external circuit occupies wide area. Moreover, another kind of noise is introduced during the elimination of the fixed pattern noise.

SUMMARY OF THE INVENTION

It is therefore an important object of the present invention to provide a solid-state image sensing device, which makes a read-out circuit simple without undesirable influence of the fixed pattern noise.

It is also an important object of the present invention to provide a simple read-out circuit available for the solid-state image sensing device.

In accordance with one aspect of the present invention, there is provided a solid-state image sensing device comprising a plurality of image pick-up pixels respectively including bolometers varying the resistivity thereof depending upon the magnitude of an electromagnetic power incident thereon and connected to a first constant voltage source, a first signal output node for out-putting an output data signal containing a noise component due to a pattern of the plurality of image pick-up pixels and representative of the resistivity of a selected image pick-up pixel sequentially selected from the plurality of image pick-up pixels, a second signal output node for outputting a reference signal representative of the magnitude of the noise component of the selected image pick-up pixel, a selector associated with the plurality of image pick-up pixels and sequentially connecting the first signal output node through the bolometer of the selected image pick-up pixel to the first constant voltage source for producing said output data signal, and a plurality of reference pixels located in the vicinity of said plurality of image pick-up pixels so as to produce said reference signal.

In accordance with another aspect of the present invention, there is provided a read-out circuit connected to a solid-state image sensing device including a plurality of image pick-up pixels each having a bolometer comprising a first bipolar transistor connected between a common node and a first constant voltage source through the bolometer of a selected image pick-up pixel sequentially selected from said plurality of image pick-up pixels and flowing a first branch current of a main current between said common node and said first constant voltage source, said bolometer of said selected image pick-up pixel having a resistivity representative of the intensity of a part of an electromagnetic radiation and a noise component, a second bipolar transistor connected between a second constant voltage source different at voltage level from said first constant voltage source and said common node through bolometers of first reference pixels incorporated in said solid-state image sensing device and flowing said main current between said second constant voltage source and said common node, said first reference pixels having a resistivity representative of a deviation of said noise component from a standard noise component of one of said plurality of image pick-up pixels, a third bipolar transistor connected between said common node and said first constant voltage source through bolometers of second reference pixels incorporated in said solid-state image sensing device and flowing a second branch current of said main current between said common node and said first constant voltage source, said second reference pixels having a resistivity representative of said standard noise component, an integrating capacitor connected between said first constant voltage source and said common node, and a reset circuit connected between a source of reset level and said common node for periodically resetting said integrating capacitor to said reset level.

BRIEF DESCRIPTION OF THE DRAWINGS

The features and advantages of the solid-state infrared image sensing device and the read-out circuit will be more clearly understood from the following description taken in conjunction with the accompanying drawings in which.

DESCRIPTION OF THE PREFERRED EMBODIMENTS

First Embodiment

Figure 3:
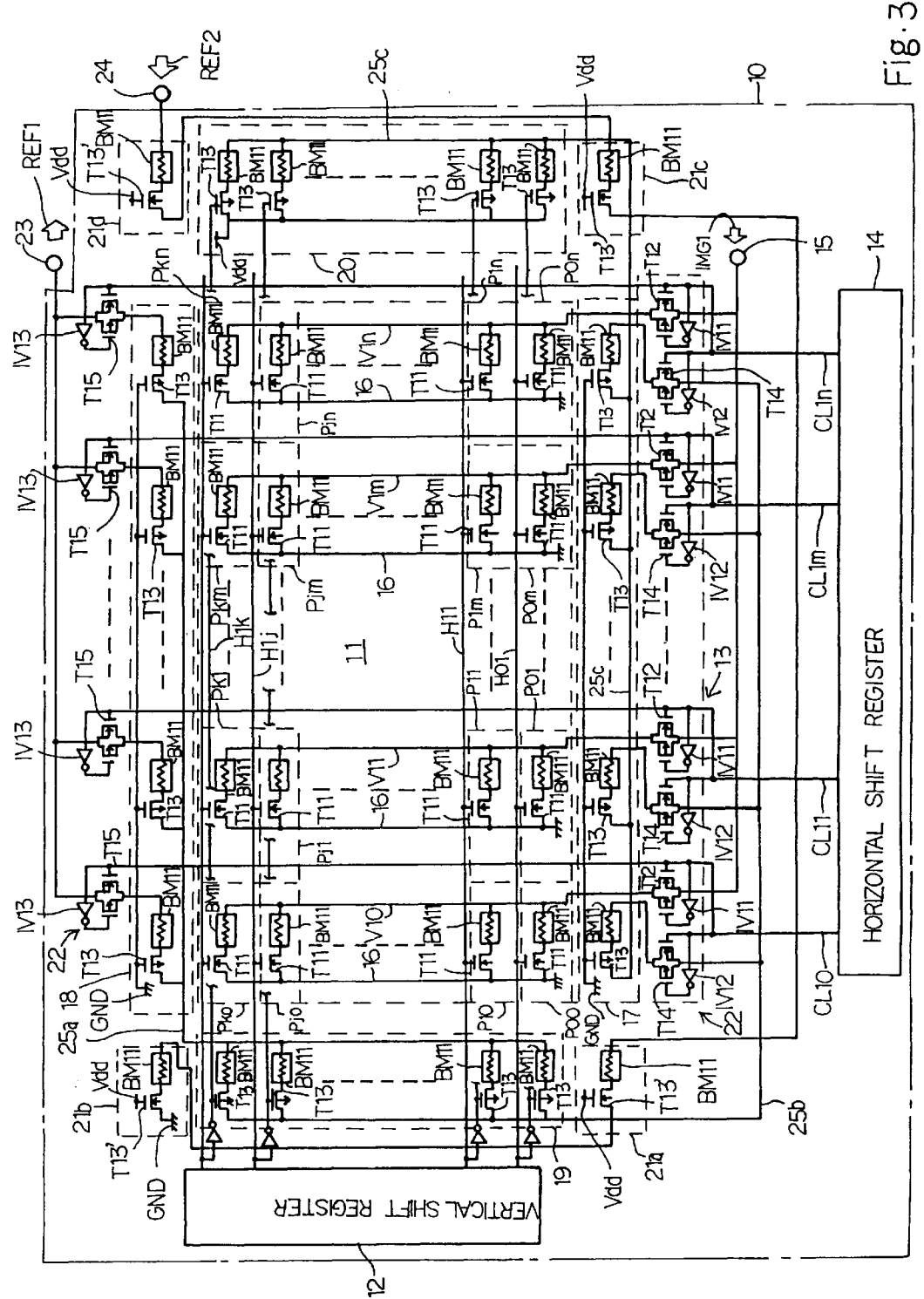
FIG. 3 is a circuit diagram showing the circuit arrangement of a solid-state image sensing device according to the present invention.

Referring to FIG. 3 of the drawings, a solid-state image sensing device embodying the present invention is fabricated on a semiconductor chip 10. The solid-state image sensing device comprises a pixel array 11, a vertical shift register 12, a first horizontal selector 13 and a horizontal shift register 14. An infrared image falls on the pixel array 11, and the pixel array 11 converts the infrared image to potential differences, and the vertical shift register 12, the first horizontal selector 13 and the horizontal shift register 14 produces an analog image carrying signal IMG1 from the potential differences at an output node 15.

Plural image pick-up pixels PX00, PX01, . . . PX0m, PX0n, PX10, PX11, . . . PX1m, PX1n, PXj0, PXj1, . . . PXjm, PXjn, PXk0, PXk1, . . . PXkm and PXkn are arranged in rows and columns, and form the pixel array 11. The image pick-up pixels PX00 to PXkn are similar in circuit configuration to one another, and each of the image pick-up pixels PX00 to PXkn is implemented by a series combination of an n-channel enhancement type field effect transistor T11 and a bolometer BM11. The bolometer BM11 is, by way of example, formed of titanium, and varies the resistance together with the temperature thereon. The n-channel enhancement type field effect transistors T11 are grounded through source lines 16. The bolometer BM11 is sensitive to electromagnetic power such as infrared, and varies the resistivity depending upon the magnitude of the incident power.

The image pick-up pixels P00 to Pkn are formed on a diaphragm (not shown). An intermediate layer between a lower layer and the diaphragm is etched away so as to space the diaphragm from the lower layer. The diaphragm is desirable for the image pick-up pixels P00 to Pkn, because the gap does not quickly propagate the heat to the lower layer. Temperature ΔT of each bolometer BM11 through the self heat generation is expressed as $$\Delta T = (I^2 R t)/(G_{th} \tau) \qquad \text{equation 1}$$

where I is current flowing through the bolometer BM11, R is resistance of the bolometer BM11, t is time to flow the current, Gth is heat conductance and τ is thermal time constant. As described hereinbefore, the bolometers BM11 are formed on the diaphragm spaced from the lower layer, and, accordingly, the gap makes the heat conductance Gth small. However, the time t is so short that the self heat generation does not destroy the bolometers BM11 of the image pick-up pixels P00 to Pkn.

The columns of image pick-up pixels PX00–PXj0, PX01–PXk1, . . . PX0m–PXkm and PX0n–PXkn are associated with vertical signal lines V10, V11, . . . , V1m and V1n, respectively, and each of the vertical signal lines V10 to V1n is connected between the bolometers BM11 of the associated column and the first horizontal selector 3. The rows of image pick-up pixels PX00–PX0n, PX10–PX1n, PXj0–PXjn and PXk0–PXkn are respectively associated with row selecting lines H10, H11, . . . H1j and H1k, and each of the row selecting lines H10 to H1k is connected to the gate electrodes of the n-channel enhancement type field effect transistors T11 of the associated row of image pick-up pixels.

The row selecting lines H10 to H1k are connected to the vertical shift register 12, and the vertical shift register 12 sequentially changes the row selecting lines H10 to H1k to active high level, and the bolometers BM11 of each row of image pick-up pixels are concurrently connected through the source lines 16 to the ground.

The first horizontal selector 13 includes first transfer gates T12 connected between the vertical signal lines V10 to V1n and the output node 15 and inverters IV11 respectively associated with the first transfer gates T12. Each of the first transfer gates T12 is implemented by a parallel combination of an n-channel enhancement type field effect transistor and a p-channel enhancement type field effect transistor, and the parallel combinations T12 are connected between the vertical signal lines V10 to V1n and the output node 15. The horizontal shift register 14 has plural control lines CL10/CL11/CL1m and CL1n, and sequentially changes the control lines CL10 to CL1n to the active level. The control lines CL10 to CL1n are respectively associated with the first transfer gates T12. Each control line CL10/CL11/CL1m/CL1n is directly connected to the gate electrode of the n-channel enhancement type field effect transistor of the associated first transfer gate T12, and is connected through the inverter IV11 to the gate electrode of the p-channel enhancement type field effect transistor of the associated first transfer gate T12. The horizontal shift register 14 sequentially changes the control lines CL10 to CL1n to the active level. Thus, the vertical shift register 12 and the horizontal shift register 14 sequentially connect the image pick-up pixels PX00 to PXkn to the output node 15.

The solid-state image sensing device further comprises a first row 17 of reference image pick-up pixels located along the row of image pick-up pixels P00 to P0n, a second row 18 of reference image pick-up pixels located along the row of image pick-up pixels Pk0 to Pkn, a first column 19 of reference pixels located along the column of image pick-up pixels P00 to Pk0, a second column 20 of reference pixels located along the column of image pick-up pixels P0n to Pkn and four reference pixels 21a/21b/21c/21d located in the vicinity of the four corners of the pixel array 11. Thus, the pixel array 11 is surrounded by the reference pixels 17/18/19/20/21a/21b/21c/21d. Each of the reference pixels 17/18 is implemented by a series combination of the bolometer BM11 and a p-channel enhancement type field effect transistor T13, and each of the reference pixels 19/20 is also implemented by a series combination of the bolometer BM11 and a p-channel enhancement type field effect transistor T13. Each of the four reference pixels 21a to 21d is implemented by a series combination of the bolometer BM11 and the p-channel enhancement type field effect transistor T13. The reference pixels 17/18/19/20/21a to 21d are equal in size to the image pick-up pixels P00 to Pkn, and are designed to have a certain resistance under the same conditions. In order to compensate the back gate biasing effect, the source is connected to the back gate of each field effect transistor T13.

The reference pixels 17/18/19/20/21a to 21d are fabricated in the same process sequence as the image pick-up pixels P00 to Pkn, and, accordingly, the dispersion of resistance is approximately equal between the row of reference pixels 17 and the row of image pick-up pixels P00 to P0n, between the row of reference pixels 18 and the row of image pick-up pixels Pk0 to Pkn, between the column of reference pixels 19 and the column of image pick-up pixels P00 to Pk0 and between the column of reference pixels 20 and the column of image pick-up pixels P0n to Pkn.

Although the bolometers BM11 of the image pick-up pixels P00 to Pkn are formed on the diaphragm spaced from the lower layer, the bolometers BM11 of the reference pixels 17/18/19/20/21a to 21d are not formed on the diaphragm. The bolometers BM11 of the reference pixels 17 to 20 and 21a to 21d are conducted through the intermediate layer, which are not etched away under the bolometers BM11 of the reference pixels 17 to 20 and 21a to 21d, to the lower layer, and the heat conductance Gth is much larger than that of each image pick-up pixel P00 to Pkn. However, the reference pixels 17 to 20 are selected for a long time at short intervals. For this reason, the reference pixels 17 to 20 are not sensitive to the incident infrared ray, and are never broken due to the self heat generation.

The solid-state image sensing device further comprises a second horizontal selector 22. The second horizontal selector 22 includes second transfer gates T14, inverters IV12 respectively associated with the second transfer gates T14, third transfer gates T15 and third transfer gates T15 respectively associated with the third transfer gates T15. Each of the second transfer gates T14 is implemented by the parallel combination of the n-channel enhancement type field effect transistor and the p-channel enhancement type field effect transistor. Similarly, each of the third transfer gates T15 is implemented by the parallel combination of the n-channel enhancement type field effect transistor and the p-channel enhancement type field effect transistor.

The second transfer gates T14 are respectively associated with the reference pixels of the first row 17, and the third transfer gates T15 are respectively associated with the reference pixels of the second row 18. The control lines CL10 to CL1n are respectively associated with the second transfer gates T14, and are further associated with the third transfer gates T15, respectively. Each of the control lines CL10 to CL1n is connected to the gate electrode of the n-channel enhancement type field effect transistor of the associated second transfer gate T14 and the gate electrode of the n-channel enhancement type field effect transistor of the associated third transfer gate T15. Each control line CL10 to CL1n is further connected through the inverter IV12 to the gate electrode of the p-channel enhancement type field effect transistor of the associated second transfer gate T14 and through the inverter IV13 to the gate electrode of the p-channel enhancement type field effect transistor of the associated third transfer gate T15. Thus, the second horizontal selector 22 selects one of the second transfer gates T14 and one of the third transfer gates T15 both associated with selected one of the columns of image pick-up pixels P00–Pk0, P01–Pk1, P0m–Pkm and P0n–Pkn.

A first reference signal node 23 is provided for the reference pixels 17, 18, 19 and 20, and a second reference signal node 24 is provided for the four reference pixels 21a to 21d. The third transfer gate T15, the second row of reference pixels 18, the first column of reference pixels 19, the second transfer gate T14, the first row of reference pixels 17 and the second column 20 of reference pixels are connected in series between the first reference signal node 23 and a positive power supply line Vdd. On the other hand, the four reference pixels 21d, 21c, 21a and 21b are connected in series between the second reference signal node 24 and a ground line GND.

The positive power voltage Vdd is supplied through the reference pixels 17 to 20 to the first reference signal node 23, and the p-channel enhancement type field effect transistors T13 are desirable for the reference pixels 17 to 20, because the p-channel enhancement type field effect transistors T13 decrease the resistance against the current flowing from the positive power supply line Vdd. On the other hand, the second reference signal node 24 is connected through the four reference pixels 21a to 21d to the ground line GND, and the n-channel enhancement type field effect transistors T13' are appropriate for the reference pixels 21a to 21d, because the n-channel enhancement type field effect transistors 21a to 21d decrease the resistance against the current flowing into the ground line GND.

The third transfer gates T15 are connected in parallel to the first reference signal node 23, and the reference pixels 18 are connected between the associated third transfer gates T15 and a transfer signal line 25a. The reference pixels 19 are connected in parallel between the transfer signal line 25a and another transfer signal line 25b, and the second transfer gates T14 are connected in parallel to the signal transfer line 25b. The reference pixels 17 are connected between the second transfer gates T14 and a signal transfer line 25c, and the reference pixels 20 are connected in parallel between the signal transfer line 25c and the positive power supply line Vdd.

The ground line GND is connected to the gate electrodes of the p-channel enhancement type field effect transistors T13 of the reference pixels 18, and those p-channel enhancement type field effect transistors T13 are turned on at all times. For this reason, the first reference signal node 23 is connected through selected one of the third transfer gates T13 and the associated reference pixel 18 to the signal transfer line 25a.

The row selecting lines H01 to H1k are respectively connected through inverters to the gate electrodes of the p-channel enhancement type field effect transistors T13 of the reference pixels 19, and the inverters are further connected to the gate electrodes of the p-channel enhancement type field effect transistors T13 of the reference pixels 20, respectively. For this reason, when the vertical shift register changes one of the row selecting lines H01 to H1k to the active high level, the associated reference pixel 19 and the associated reference pixel 20 are selected from the first column and the second column, and the p-channel enhancement type field effect transistors T13 turn on. As a result, the transfer signal line 25a is connected through the selected reference pixel 19 to the reference signal line 25b, and the reference signal line 25c is connected through the selected reference pixel 20 to the positive power supply line Vdd.

The ground line GND is connected to the gate electrodes of the p-channel enhancement type field effect transistors T13 of the reference pixels 17, and those p-channel enhancement type field effect transistors T13 are turned on at all times. For this reason, when the control signal lines CL10 to CL1n select one of the second transfer gates T14, the signal transfer line 25b is connected through the selected second transfer gate T14 and the associated reference pixel 17 to the signal transfer line 25c. As a result, current flows from the positive power supply line Vdd through one of the reference pixels 20, the signal transfer line 25c, one of the reference pixels 17, one of the reference pixels 17, one of the second transfer gates T14, the signal transfer line 25b, one of the reference pixels 19, the signal transfer line 25a, one of the reference pixels 18 and one of the third transfer gates T13 to the first reference signal node 23.

The positive power supply line Vdd is connected to the gate electrodes of the n-channel enhancement type field effect transistors T13' of the reference pixels 21a to 21d, and the n-channel enhancement type field effect transistors T137 are turned on at all times. As a result, the second reference signal node 24 is connected through the reference pixels 21d, 21c, 21a and 21b to the ground line GND.

The solid state image sensing device behaves as follows. While the image pick-up pixels P00 to Pkn are converting an infrared image to the image carrrying signal IMG1, the horizontal shift register 12 periodically sequentially selects the rows of image pick-up pixels P00 to P0n, P10 to P1n, ..., Pj0 to Pjn and Pk0 to Pkn, and the horizontal shift register 14 sequentially changes the control signal lines CL10 to CL1n to the active level for each row of image pick-up pixels. The infrared image differently gives the infrared energy to the bolometers BM11 of the image-pick-up pixels P00 to Pkn, and those bolometers BM11 varies the resistivity depending upon the incident infrared energy. For this reason, while the vertical shift register 12 and the horizontal shift register 14 is sequentially selecting the image pick-up pixels P00 to Pkn from the pixel array 11, the image carrying signal IMG1 varies the potential level at the output node 15 depending upon the resistivity of the selected image pick-up pixel, and the variation of the potential level at the output node 15 affects internal current of a read-out circuit 31 (see FIG. 4) as will be described hereinlater in detail.

The vertical shift register 12 sequentially selects the reference pixel 19 and the reference pixel 20 from the first column and the second column, respectively, and the horizontal shift register 14 sequentially selects the reference pixel 17 and the reference pixel 18 from the first row and the second row, respectively. The selected reference pixels 18, 19, 17 and 20 are connected in series from the positive power supply line Vdd to the first reference signal node 23, and a first reference current signal REF1 is supplied from the first reference node 23 to the read-out circuit 31.

The four reference pixels 21a to 21d are selected at all times, and a second reference current signal REF2 flows from the second reference signal node 24 through the four reference pixels 21a to 21d into the ground line GND. The second reference current signal REF2 is supplied from the read-out 31 circuit at all times. Using the reference current signals REF1/REF2, the read-out circuit 31 eliminates the fixed pattern noise from the image carrying signal IMG1.

Figure 4:
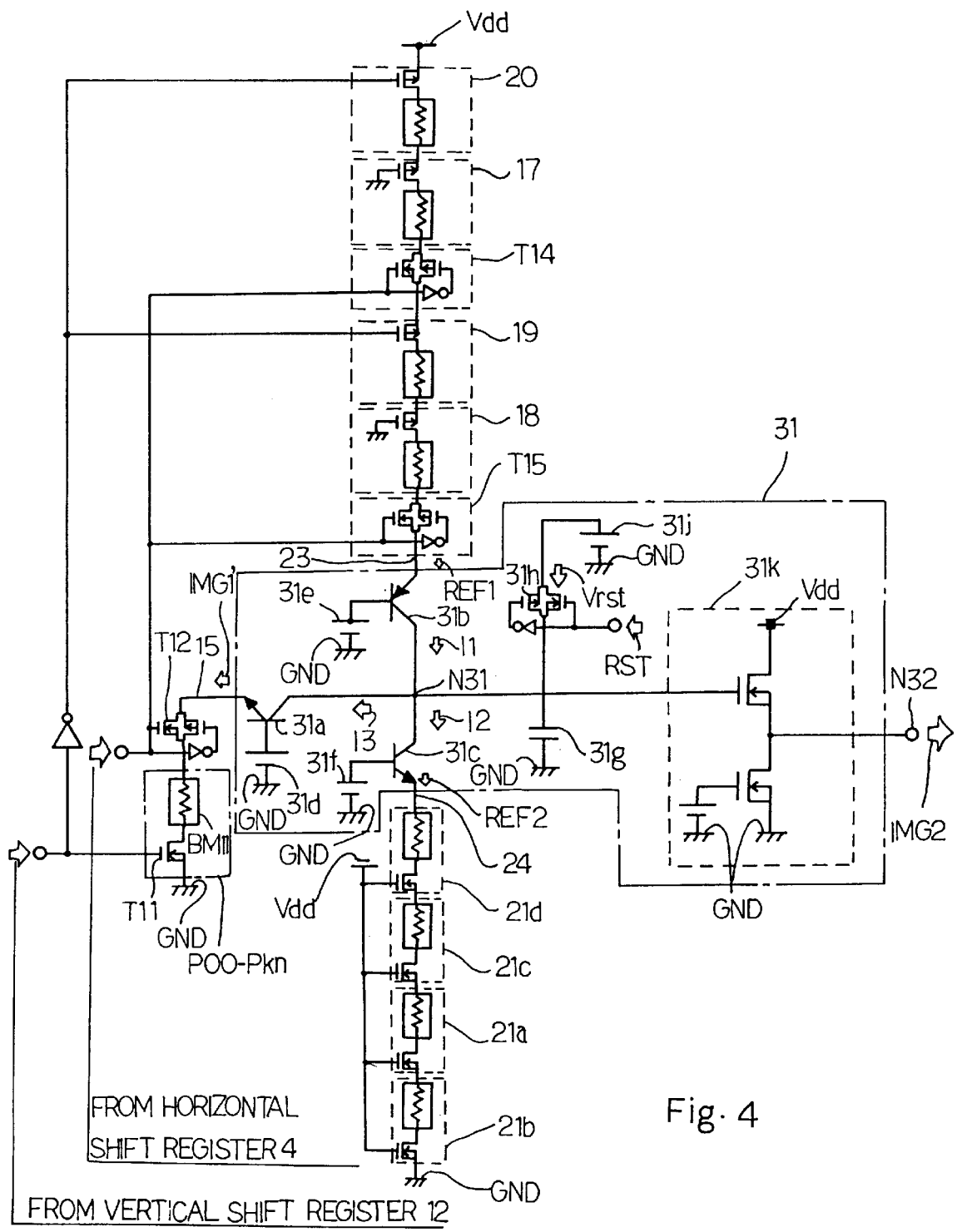
FIG. 4 is a circuit diagram showing the circuit arrangement of a read-out circuit associated with the solid-state image sensing device.

FIG. 4 illustrates the circuit configuration of the read-out circuit 31 incorporated in an external circuit. The read-out circuit 31 includes an integrating bipolar transistor 31a, a charging bipolar transistor 31b and a discharging bipolar transistor 31c and bias voltage sources 31d/31e/31f. The collector nodes of these bipolar transistors 31a, 31b and 31c are connected to a common node N31, and the bias voltage sources 31d/31e/31f are connected between the base nodes of the bipolar transistors 31a/31b/31c and the ground line GND.

The first reference signal node 23 supplies the first reference current signal REF1 to the collector node of the charging bipolar transistor 31b, and the charging bipolar transistor 31b supplies biasing current I1 to the common node N31. The biasing current I1 is branched to two branch currents I2 and I3. The branch current I2 is supplied to the collector node of the discharging bipolar transistor 31c, and the discharging bipolar transistor 31c supplies the second reference current signal REF2 through the reference pixels 21d/21c/21a/21b to the ground line GND. The reference pixels 21a to 21d offer resistance against the reference current signal REF2, and the amount of second reference current signal REF2 is varied depending upon the total resistance of the reference pixels 21a to 21d. On the other hand, the branch current I3 is supplied to the collector node of the integrating bipolar transistor 31a, and the integrating bipolar transistor 31a supplies the first reference current signal REF1 through the transfer gate T12 and the selected image pick-up pixel P00 to Pkn to the ground line GND.

The read-out circuit 31 further includes an integrating capacitor 31g, connected between the common node N31 and the ground line GND, a reset switch 31h connected between a reset voltage source 31j and the common node N31 and a source follower 31k connected between the common node N31 and a read-out node N32. When a reset signal RST is supplied to the reset switch 31h, the reset switch 31h turns on, and the integrating capacitor 31g is reset to a reset voltage Vrst. The potential level at the integrating capacitor 31g is varied, and the source follower 31k is responsive to the potential variation of the integrating capacitor 31g for producing a noise-free image carrying signal IMG2.

The manufacturer firstly regulates the bias voltage source 31d to an appropriate value. Then, the amount of image carrying current signal IMG1' is determined. Subsequently, the manufacturer regulates the bias voltage sources 31e/31f to appropriate values in such a manner that the amount of image carrying current signal IMG1' is equal to the difference between the amount of first reference current signal REF1 and the amount of second reference current signal REF2, i.e., I3=2I3-I3 (see equation 7).

Figure 1:
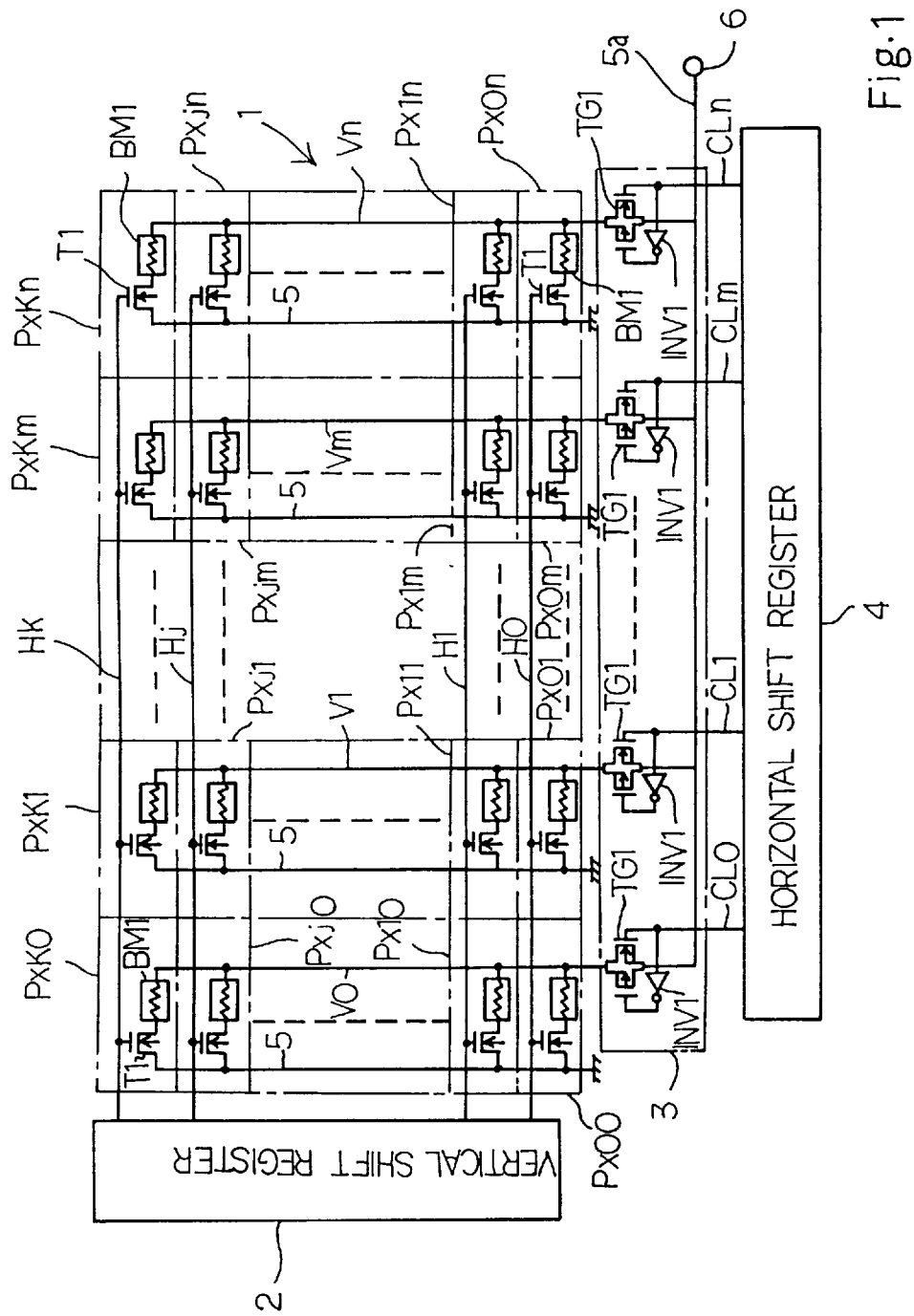
FIG. 1 is a circuit diagram showing the circuit arrangement of the prior art solid-state infrared image sensing device.
Figure 2A:
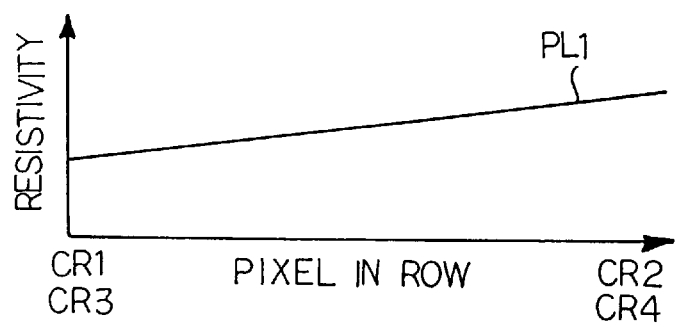
FIG. 2A is a graph showing the dispersion of resistance in the direction of the rows of image pick-up pixels.
Figure 2B:
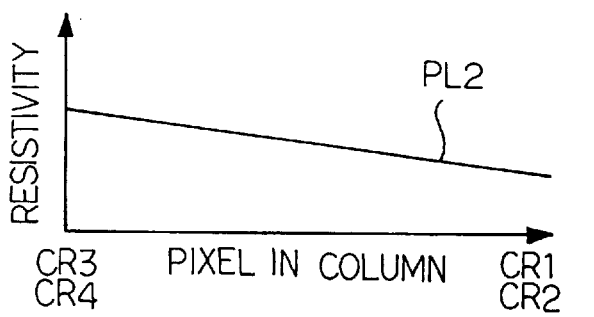
FIG. 2B is a graph showing the dispersion of resistance in the direction of the columns of image pick-up pixels.
Figure 2C:
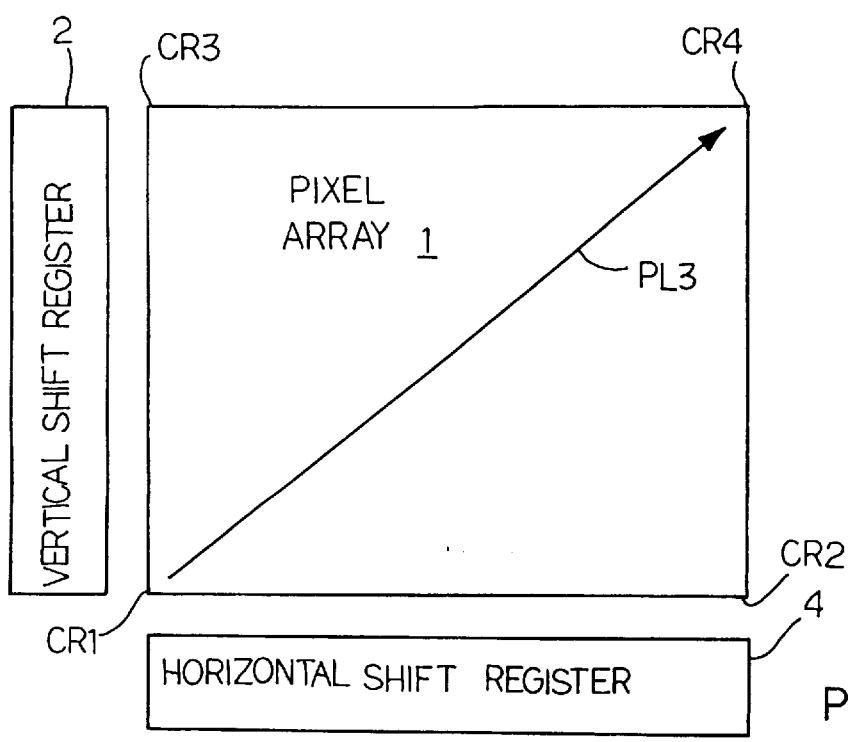
FIG. 2C is a block diagram showing the pixel array with the dispersion of resistance.
Figure 5:
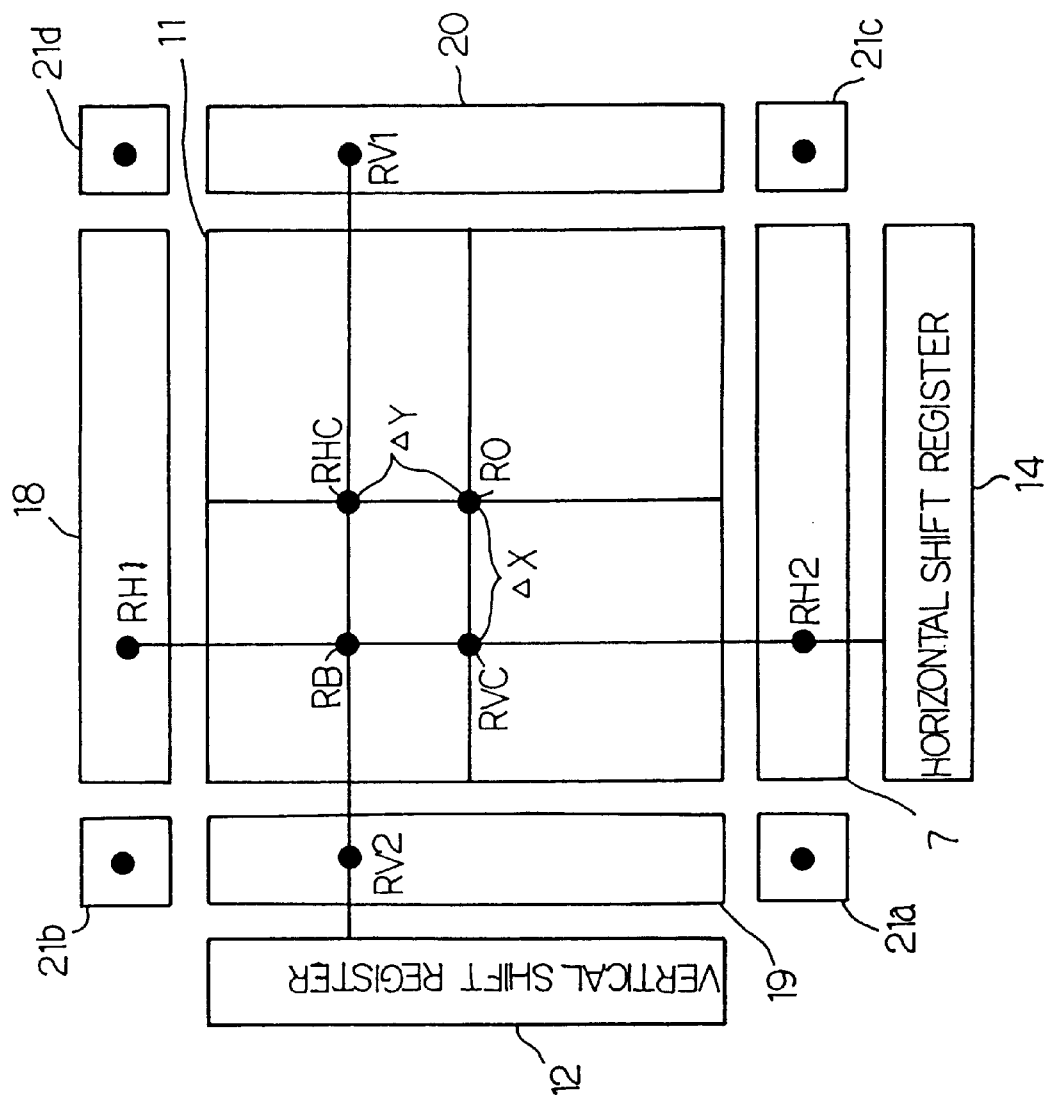
FIG. 5 is a schematic view showing the reference pixels selected together with an image pick-up pixel.

The fixed pattern noise is eliminated from the image carrying signal IMG1 as follows. Assuming now that the vertical shift register 12 and the horizontal shift register 14 selects the image pick-up pixel PB from the pixel array 11 as shown in FIG. 5, the vertical shift register 12 concurrently selects the reference pixels RV2 and RV1 from the first column of reference pixels 19 and the second column of reference pixels 20, respectively, and the horizontal shift register 14 selects the reference pixels RH2 and RH1 from the first row of reference pixels 17 and the second row of reference pixels 18, respectively. As described hereinbefore, the first row of reference pixels 17, the second row of reference pixels 18, the first column of reference pixels 19 and the second row of reference pixels 20 have dispersions of resistivity substantially identical with those of the row of image pick-up pixels P00 to P0n, the row of image pick-up pixels Pk0 to Pkn, the column of image pick-up pixels P00 to Pk0 and the column of image pick-up pixels P0n to Pkn, respectively. In case where the dispersions of resistivity incline as indicated by plots PL1 and Pl2 (see FIGS. 2A and 2B), the image pick-up pixel RVC at the center of the column has the resistivity approximately equal to the average between the resistivity of the reference pixel RH1 and the resistivity of the reference pixel RH2, and the image pick-up pixel RHC in the row has the resistivity equal to the average between the resistivity of the reference pixel RV2 and the resistivity of the reference pixel RV1. Moreover, the image pick-up pixel RO at the center of the array 11 has the resistivity equal to the average between the reference pixels 21a to 21d.

The difference in resistivity between the image pick-up pixels RHC and RO is expressed by ΔY, and the difference in resistivity between the image pick-up pixels RVC and RP is expressed by ΔX, the resistivity RB0 of the selected image pick-up pixel RB is given by equation 2.

$$RB0 = RRO + \Delta Y + \Delta X \qquad \text{equation 2}$$

The resistivity of the image pick-up pixel RO is assumed to be "R". If the resistivity ranges between −A percent and +A percent in the row of image pick-up pixels along the center line of the columns of image pick-up pixels and ranges between −B percent and +B percent along the center ling of the rows of the rows, the resistivity is dispersed in the image pick-up pixels P00 to Pkn as shown in FIG. 5. The image pick-up pixel Rk0 has the resistivity Rk0 expressed as $$Rk0 = (1 - A)(1 + B)R \qquad \text{equation 3}$$
$$= (1 - A + B - AB)R$$

The right side of equation 2 is modified as $$RRO + \Delta Y + \Delta X = R + \{(1 - A)R - R\} + \{(1 + B)R - R\} \qquad \text{equation 4}$$
$$= (1 - A + B)R$$

Figure 6:
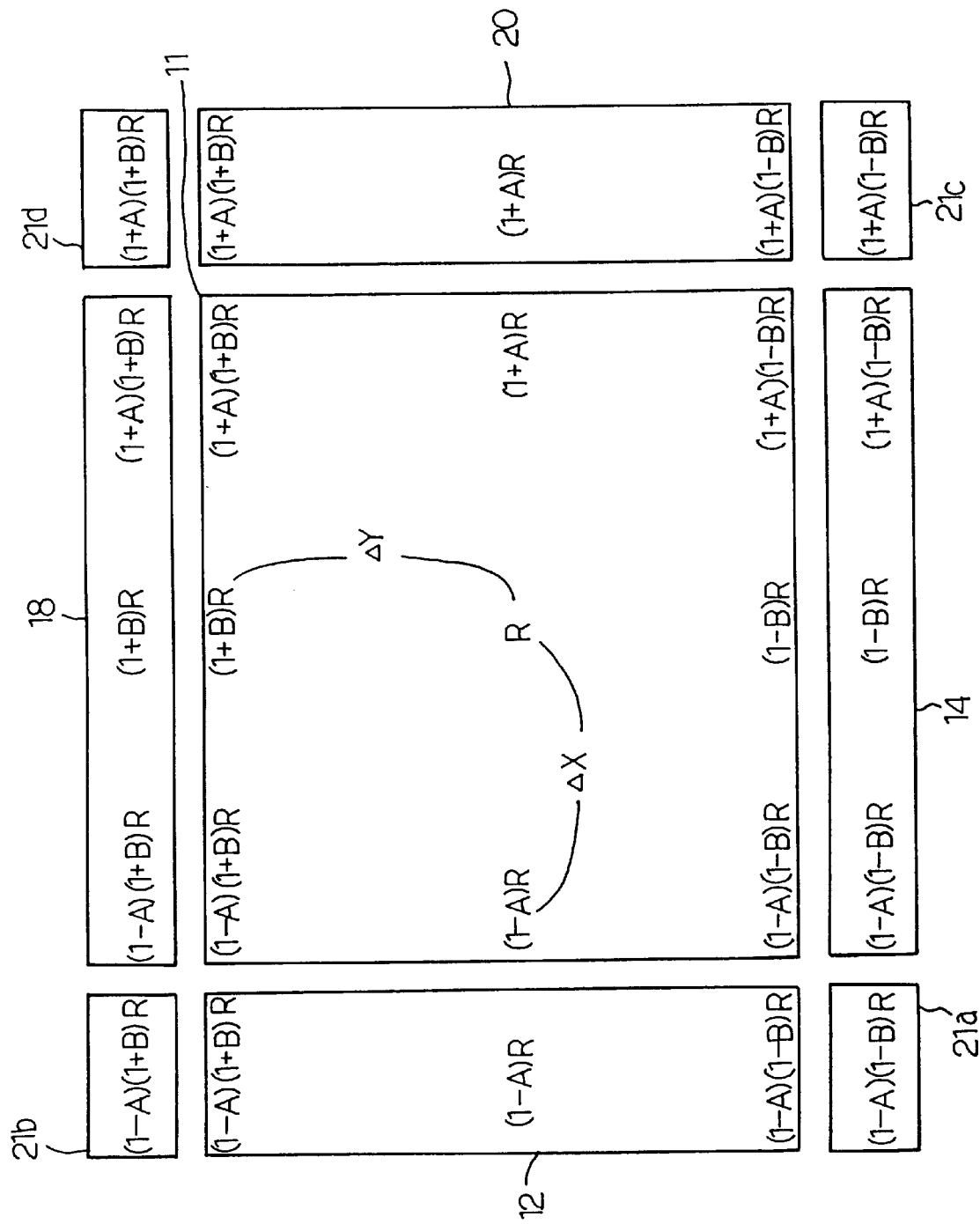
FIG. 6 is a schematic view showing the dispersion of resistivity in an image pick-up pixel array.

Comparing equation 3 with equation 4, equation 3 contains product "AB". If either "A" or "B" is much smaller than the other, equation 3 is approximated to equation 4, Thus, the dispersion of resistivity shown in FIG. 6 is available for the estimation.

Turning back to FIG. 5, the read-out circuit carries out the above described calculation. The selected image pick-up pixel RB has the resistivity RB0, the selected reference pixel PV1 has the resistivity RBV1, the selected reference pixel PV2 has the resistivity RBV2, the selected reference pixel RH1 has the resistivity RBH1, the selected reference pixel RH2 has the resistivity RBH2, the reference pixel 21a has the resistivity RBc, the reference pixel 21b has the resistivity RBd, the reference pixel 21d has the resistivity Rba, and the reference pixel 21c has the resistivity RBb. Then, equation 2 is modified as follows.

$$RB0 = RRO + \Delta Y + \Delta X \qquad \text{equation 5}$$
$$= \{(Rba + RBb + RBc + RBd)/4\} +$$
$$\{(RBV1 + RBV2)/2\} -$$
$$\{(Rba + RBb + RBc + RBd)/4\}\} +$$
$$\{(RBH1 + RBH2)/2\} -$$

-continued $$\{(Rba+RBb+RBc+RBd)/4\}\}$$
$$=\{(RBV1+RBV2+RBH1+RBH2)/2\}-$$
$$\{(RBa+RBb+RBc+RBd)/4\}$$

The calculation expressed by equation 5 is achieved by the read-out circuit 31. In detail, the reset signal RST is firstly supplied to the reset switch 31h, and the reset 31h turns on. Then, the integrating capacitor 31g is changed to the reset voltage level, and, thereafter, the reset signal RST is removed.

After the reset, current flows into and from the integrating capacitor 31g as follows. The first current component is the branch current I3, and flows from the integrating capacitor 31g through the common node N31 into the collector of the integrating bipolar transistor 31a. The integrating bipolar transistor 31a is appropriately biased with the bias voltage source 31d, and the image carrying signal IMG1 flows through the bolometer BM11 of the selected image pick-up pixel. The amount of image carrying signal IMG1 is inversely proportional to the resistance of the selected image pick-up pixel.

The second current component is the main current I1, and flows from the collector node of the charging bipolar transistor 31b. The first reference current signal REF1 flows into the emitter node of the charging bipolar transistor 31b, and the charging bipolar transistor 31b biased with the biasing voltage source 31e supplies the main current I1 through the common node N31 to the integrating capacitor 31g. The amount of main current I1 is inversely proportional to the total resistance of the reference pixels 20/17/19 and 18.

The third current component is the branch current I2. The branch current I2 flows from the integrating capacitor 31g through the common node N31 to the collector node of the discharging bipolar transistor 31c. The discharging bipolar transistor 31c is biased with the biasing voltage source 31f, and the second reference current signal REF2 flows through the reference pixels 31d/21c/21a/21b into the ground line GND. The amount of branch current I2 is inversely varied with the total resistance of the four reference pixels 21a to 21d.

The elimination of fixed pattern noise is equivalent to restriction of the variation of the current flowing from and into the integrating capacitor 31g. In other words, equation 6 is established in the read-out circuit.

$$I3=I1-I2 \qquad \text{equation 6}$$

The first term and the second term of equation 5 are corresponding to the main current I1 and the branch current I2, respectively. The selected image pick-up pixel RB is roughly equal in resistance to each of the reference pixels RV2, RV1, RH1, RH2, 21a to 21d, and the branch current I3 is corresponding to the resistance RB0. Then first term, i.e., {(RBV1+RBV2+RBH1+RBH2)/2} is roughly equal to (4 RB0/2), and the main current I1 is equivalent to 2I3. Similarly, the branch current I2 is equivalent to I3. Equation 6 is modified to equation 7.

$$I3=2I3-I3 \qquad \text{equation 7}$$

Thus, the selected image pick-up pixel, the reference pixels 17 to 20 and 21a to 21d and the bipolar transistors 31a/31b/31c make the current flowing from and into the integrating capacitor 31g substantially constant. In other words, when the main current I1 is twice as much as the branch current I3, which in turn is as much as the branch current I2, the current flowing from and into the integrating capacitor 31g is made constant, and variation of current due to the fixed pattern noise is eliminated from the image carrying signal IMG1.

The above described conditions are achieved as follows. The potential difference between the positive power supply line Vdd and the emitter node of the charging bipolar transistor 31b is eight times larger than the potential difference between the emitter node of the integrating bipolar transistor 31a and the ground line GND. The reference pixels 17 to 20 offer the total resistance four times larger than the resistance of the selected image pick-up pixel, and it is necessary that the main current I1 is twice as much as the branch current I3. The above relations between the charging bipolar transistor 31b and the integrating bipolar transistor 31a are achieved by appropriately regulating the relation between the biasing voltage sources 31e and 31d.

Moreover, the potential difference between the emitter node of the discharging bipolar transistor 31c and the ground line GND is four times larger than the potential difference between the emitter node of the integrating bipolar transistor 31a and the ground line GND. The four reference pixels 21a to 21d are connected in series between the emitter node of the discharging bipolar transistor 31c and the ground line GND, and the four reference pixels 21a to 21d offer the total resistance four times larger than the resistance of the selected image pick-up pixel. The relation between the integrating bipolar transistor 31a and the discharging bipolar transistor 31c is achieved by appropriately regulating the relation between the biasing voltage sources 31d and 31f.

As will be understood from the foregoing description, the reference pixels 17 to 20 and 21a to 21d produces the first and second reference current signals REF1/REF2 representative of the deviation ΔY+ΔX of the fixed pattern noise component at the selected image pick-up pixel RB with respect to the image pick-up pixel RO at the center of the pixel array 11, and the read-out circuit 31 eliminates the fixed pattern noise component from the noise containing image carrying signal IMG1. Then, the noise-free image carrying signal IMG2 is output from the read-out circuit 31.

Second Embodiment

Figure 7:
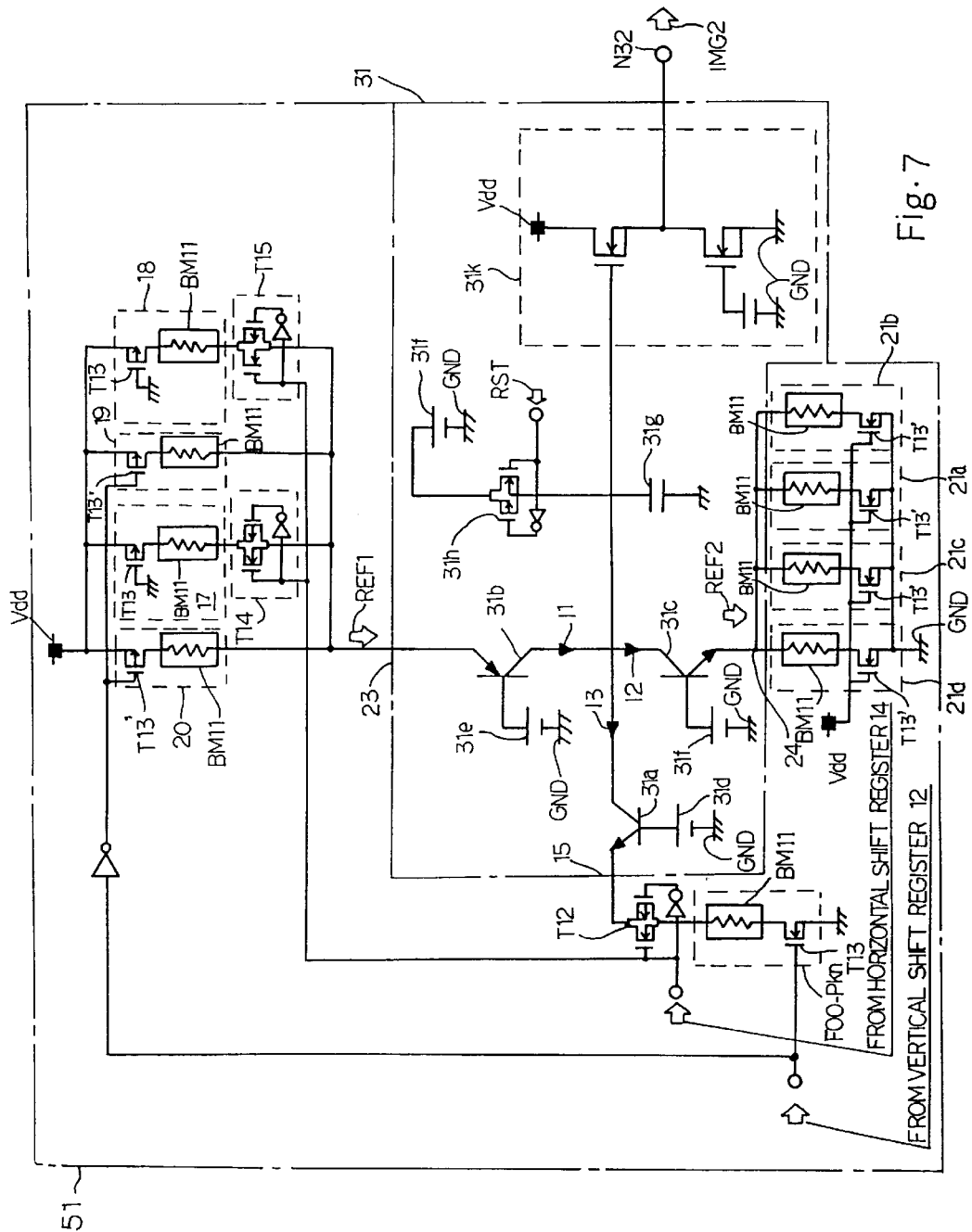
FIG. 7 is a circuit diagram showing circuit configuration of another solid-state image sensing device connected to a read-out circuit according to the present invention.

FIG. 7 illustrates another solid-state image sensing device 41 embodying the present invention accompanied with the read-out circuit 31. The solid-state image sensing device 41 is similar to the solid-state image sensing device implementing the first embodiment except arrangement of reference pixels 17 to 20 and 21a to 21d. For this reason, circuit components of the solid-state image sensing device 51 are labeled with the same references designating corresponding circuit components of the first embodiment without detailed description.

The reference pixels 17 to 20 are connected in parallel between the positive power supply line Vdd and the first signal output node 23, and the four reference pixels 21a to 21d are also connected in parallel between the second signal output node 24 and the ground line GND.

The ground voltage is supplied to the gate electrodes of the p-channel enhancement type field effect transistors T13 of the reference pixels 17/18, and the p-channel enhancement type field effect transistors T13 are turned on at all times. For this reason, when the horizontal shift register 14 changes one of the control lines CL11 to CL1n to the active level, the transfer gate T14 and the transfer gate T15 turn on concurrently with the transfer gate T12, and the associated reference pixel 17 and the associated reference pixel 18 provide current paths for the first reference current signal REF1.

On the other hand, the positive power supply line Vdd is connected to the gate electrodes of the n-channel enhancement type field effect transistors T13' of the four reference pixels 21a to 21d, and the n-channel enhancement type field effect transistors T137 are turned on at all times. For this reason, the second reference current signal REF2 flows through the four reference pixels 21a to 21d to the ground line GND at all times.

The parallel arrangement is desirable for reduction of the biasing power. The main current I1 and the branch currents I2 and I3 are assumed to be equal to those of the read-out circuit 31, respectively. The total resistance between the positive power supply line Vdd and the emitter node of the charging bipolar transistor 31b is a sixteenth of the total resistance in the read-out circuit 31, and the total resistance between the emitter node of the discharging bipolar transistor 31c and the ground line GND is also a sixteenth of the total resistance in the read-out circuit 31. Accordingly, the potential difference between the positive power supply line Vdd and the emitter node of the charging bipolar transistor 31b is decreased to a sixteenth of the corresponding potential difference in the read-out circuit 31, and the potential difference between the emitter node of the discharging bipolar transistor 31c and the ground line GND is also decreased to a sixteenth of the corresponding potential difference in the read-out circuit 31. Thus, when the biasing voltage source 31e is identical with that of the read-out circuit 31, the positive power voltage Vdd and the biasing voltage supplied from the voltage source 31f are lowered rather than those of the read-out circuit 31. However, the noise may become serious.

The Johnson noise VnRB due to the bolometer of the selected image pick-up pixel is defined by equation 8.

$$VnRB = (4kT\Delta fR)^{1/2} \qquad \text{equation 8}$$

where k is $1.38 \times 10^{-23}$, T is 300° K, $\Delta f$ is a noise band, R is the resistance of the bolometer. Equation 9 represents the Johnson noise VnRe at the emitter node of the charging bipolar transistor 31b and at the emitter node of the discharging bipolar transistor 31c.

$$VnRe = (4kT\Delta f(R^2/Re))^{1/2} \qquad \text{equation 9}$$

Where Re is the total resistance connected to the emitter node of the charging bipolar transistor 31b and the emitter node of the discharging bipolar transistor 31c. Comparing equation 8 with equation 9, the value of $(R/Re)^{1/2}$ makes the Johnson noise VnRB either greater or less than the Johnson noise VnRe.

The bolometer BM1 of the selected image pick-up pixel is equal in resistance to the bolometer BM11 of each of the reference pixels 17 to 20 and 21a to 21d. In this situation, when the reference pixels 17 to 20/21a to 21d are Connected in series, the resistance Re is four times larger than the resistance R, the Johnson noise connected to the emitter node of the bipolar transistor 31b/31c is a half of the Johnson noise of the bolometer BM11 of the selected image pick-up pixel. However, when the reference pixels 17 to 20/21a to 21d are connected in parallel, the resistance Re is a quarter of the resistance R, and the Johnson noise at the emitter node is twice larger than the Johnson noise of the bolometer of the selected image pick-up pixel. Thus, if the Johnson noise is the major element of the total noise, the parallel arrangement is less desirable.

In the first and second embodiment, the rows 17/18 of reference pixels have the p-channel enhancement type field effect transistors T13 turned on at all times, respectively, and the four reference pixels 21a to 21d have the n-channel enhancement type field effect transistors T13' turned on at all times, respectively. Those field effect transistors T13/T13' make the reference pixels 17/18 and 21a to 21d identical with the image pick-up pixels P00 to Pkn, and enhances the uniformity of the layout pattern. Even if the p-channel enhancement type field effect transistors T13 and the n-channel enhancement type field effect transistors T13' are deleted from the reference pixels 17/18 and 21a to 21d, the reference pixels 17/18 and 21a to 21d behaves as similar to those of the first/second embodiments. However, the accuracy of elimination is slightly lowered. Thus, it is desirable to make the reference pixels 17 to 20 and 21a to 21d identical in circuit configuration with the image pick-up pixels P00 to Pkn.

As will be appreciated from the foregoing description, the reference pixels 17 to 20 and 21a to 21d give the first reference current signal REF1 and the second reference current signal REF2 to the read-out circuit 31, and allows the manufacturer to simplify the circuit configuration of the read-out circuit. Using the solid-state image sensing device and the read-out circuit according to the present invention supply the noise-free image carrying signal IMG2 to an image signal processing circuit, and the image signal processing circuit can use the circuit D-range. As a result, the noise-free image carrying signal is sufficiently amplified at an initial stage, and is never deteriorated.

Although particular embodiments of the present invention have been shown and described, it will be apparent to those skilled in the art that various changes and modifications may be made without departing from the spirit and scope of the present invention.

For example, the read-out circuit may be integrated on the semiconductor chip together with the solid-state image sensing circuit.

The solid-state image sensing device is never limited to the infrared image detection. The solid-state image sensing device is available for any kind of energy radiation sensible by the bolometers.

The image pick-up pixels may be one dimensionally arranged so as to realize a line sensor.

What is claimed is:

1. A solid-state image sensing device comprising:
    a plurality of image pick-up pixels respectively including bolometers varying the resistivity thereof depending upon the magnitude of an electromagnetic power incident thereon, and connected to a first constant voltage source;
    a first signal output node for outputting an output data signal containing a noise component due to a pattern of said plurality of image pick-up pixels and representative of said resistivity of a selected image pick-up pixel sequentially selected from said plurality of image pick-up pixels;
    a second signal output node for outputting a reference signal representative of the magnitude of said noise component of said selected image pick-up pixel;
    a selector associated with said plurality of image pick-up pixels, and sequentially connecting said first signal output node through the bolometer of said selected image pick-up pixel to said first constant voltage source for producing said output data signal; and
    a plurality of reference pixels located in the vicinity of said plurality of image pick-up pixels so as to produce said reference signal.

2. The solid-state image sensing device as set forth in claim 1, in which said plurality of image pick-up pixels are arranged in rows and columns, and said plurality of reference pixels includes
  a first row of first reference pixels located along one of the outermost rows of image pick-up pixels,
  a second row of second reference pixels located along the other of said outer most rows of image pick-up pixels,
  a first column of third reference pixels located along one of the outermost columns of image pick-up pixels,
  a second column of fourth reference pixels located along the other of said outermost columns of image pick-up pixels, and
  four reference pixels located in the vicinity of the image pick-up pixels located at four corners of said plurality of image pick-up pixels arranged in rows and columns.

3. The solid-state image sensing device as set forth in claim 2, in which a first reference sub-signal flows through said four reference pixels for producing a first reference sub-signal representative of the magnitude of standard noise component at a predetermined one of said plurality of image pick-up pixels, and one of said first reference pixels, one of said second reference pixels, one of said third pixels and one of said fourth pixels are respectively selected form said first row, said second row, said first column and said second column together with said selected image pick-up pixel for producing a second reference sub-signal representative of a deviation between said magnitude of standard noise component and the magnitude of said noise component at said selected image pick-up pixel.

4. The solid-state image pick-up device as set forth in claim 3, in which said four reference pixels are connected in series between a first output sub-node of said second output node and said first constant voltage source, and said one of said first reference pixels, said one of said second reference pixels, said one of said third reference pixels and said one of said fourth reference pixels are connected in series between a second output sub-node of said second output node and a second constant voltage source different in potential level from said first constant voltage level.

5. The solid-state image pick-up device as set forth in claim 4, in which each of said plurality of image-pick up pixel is implemented by a series combination of a first switching transistor and said bolometer, and each of said first reference pixels, said second reference pixels, said third reference pixels, said fourth reference pixels and said four reference pixels is implemented by a series combination of a second switching transistor and a bolometer equivalent to said bolometer.

6. The solid-state image pick-up device as set forth in claim 5, in which said selector includes
  a plurality of row selecting lines connected to said third reference pixels of said first column, said fourth reference pixels of said second column and said rows of image pick-up pixels and sequentially changed to an active level for selecting each row of image pick-up pixels, associated one of said third reference pixels and associated one of said fourth reference pixels,
  a vertical shift register connected to said plurality of row selecting lines for sequentially changing said plurality of row selecting lines to said active level,
  a plurality of column lines respectively connected to said columns of image pick-up pixels,
  a plurality of first transfer gates connected between said plurality of column lines and said first signal output node,
  a horizontal shift register respectively connected through control lines to said plurality of first transfer gates for sequentially connecting said plurality of column lines to said first signal output node,
  a plurality of second transfer gates connected between said first reference pixels and said second output sub-node and sequentially gated by said to control lines, and
  a plurality of third transfer gates connected between said second reference pixels and said first output sub-node and sequentially gated by said control lines.

7. The solid-state image sensing device as set forth in claim 6, in which said second switching transistors of said first reference pixels, said second switching transistors of said second reference pixels and said second switching transistors of said four reference pixels are turned on at all times, and said first reference pixels and said second reference pixels are sequentially selected by means of said plurality of second transfer gates and said plurality of third transfer gates, respectively.

8. The solid-state image sensing device as set forth in claim 7, in which said first constant voltage source and said second constant voltage source generate a ground voltage and a positive voltage, respectively, said second switching transistors of said first reference pixels and said second switching transistors of said second reference pixels are of the type generating a p-type conductive channel, and said second switching transistors of said four reference pixels are of the type generating an n-type conductive channel.

9. The solid-state image pick-up device as set forth in claim 3, in which said four reference pixels are connected in parallel between a first output sub-node of said second output node and said first constant voltage source, and said one of said first reference pixels, said one of said second reference pixels, said one of said third reference pixels and said one of said fourth reference pixels are connected in parallel between a second output sub-node of said second output node and a second constant voltage source different in potential level from said first constant voltage level.

10. The solid-state image pick-up device as set forth in claim 9, in which each of said plurality of image-pick up pixel is implemented by a series combination of a first switching transistor and said bolometer, and each of said first reference pixels, said second reference pixels, said third reference pixels, said fourth reference pixels and said four reference pixels is implemented by a series combination of a second switching transistor and a bolometer equivalent to said bolometer.

11. The solid-state image pick-up device as set forth in claim 10, in which said selector includes
  a plurality of row selecting lines connected to said third reference pixels of said first column, said fourth reference pixels of said second column and said rows of image pick-up pixels and sequentially changed to an active level for selecting each row of image pick-up pixels, associated one of said third reference pixels and associated one of said fourth reference pixels,
  a vertical shift register connected to said plurality of row selecting lines for sequentially changing said plurality of row selecting lines to said active level,
  a plurality of column lines respectively connected to said columns of image pick-up pixels,
  a plurality of first transfer gates connected between said plurality of column lines and said first signal output node,
  a horizontal shift register respectively connected through control lines to said plurality of first transfer gates for sequentially connecting said plurality of column lines to said first signal output node, a plurality of second transfer gates connected between said first reference pixels and said second output sub-node and sequentially gated by said control lines, and a plurality of third transfer gates connected between said second reference pixels and said first output sub-node and sequentially gated by said control lines.

12. The solid-state image sensing device as set forth in claim 11, in which said second switching transistors of said first reference pixels, said second switching transistors of said second reference pixels and said second switching transistors of said four reference pixels are turned on at all times, and said first reference pixels and said second reference pixels are sequentially selected by means of said plurality of second transfer gates and said plurality of third transfer gates, respectively.

13. The solid-state image sensing device as set forth in claim 12, in which said first constant voltage source and said second constant voltage source generate a ground voltage and a positive voltage, respectively, said second switching transistors of said first reference pixels and said second switching transistors of said second reference pixels are of the type generating a p-type conductive channel, and said second switching transistors of said four reference pixels are of the type generating an n-type conductive channel.

14. A read-out circuit connected to a solid-state image sensing device including a plurality of image pick-up pixels each having a bolometer, comprising:

a first bipolar transistor connected between a common node and a first constant voltage source through the bolometer of a selected image pick-up pixel sequentially selected from said plurality of image pick-up pixels, and flowing a first branch current of a main current between said common node and said first constant voltage source, said bolometer of said selected image pick-up pixel having a resistivity representative of the intensity of a part of an electro-magnetic radiation and a noise component;

a second bipolar transistor connected between a second constant voltage source different in voltage level from said first constant voltage source and said common node through bolometers of first reference pixels incorporated in said solid-state image sensing device, and flowing said main current between said second constant voltage source and said common node, said first reference pixels having a resistivity representative of a deviation of said noise component from a standard noise component of one of said plurality of image pick-up pixels;

a third bipolar transistor connected between said common node and said first constant voltage source through bolometers of second reference pixels incorporated in said solid-state image sensing device, and flowing a second branch current of said main current between said common node and said first constant voltage source, said second reference pixels having a resistivity representative of said standard noise component;

an integrating capacitor connected between said first constant voltage source and said common node; and a reset circuit connected between a source of reset level and said common node for periodically resetting said integrating capacitor to said reset level.

15. The read-out circuit as set forth in claim 14, in which said amount of said first branch current is roughly equal to the difference between the amount of said main current and the amount of said second branch current.

16. The read-out circuit as set forth in claim 15, said first bipolar transistor, said second bipolar transistor and said third bipolar transistor have respective base nodes biased by a first biasing voltage source, a second biasing voltage source and a third biasing voltage source, respectively, and said first biasing voltage source, said second biasing voltage source and said third biasing voltage source supply the base node of said first bipolar transistor, the base node of said second bipolar transistor and the base node of said third bipolar transistor with a first biasing voltage, a second biasing voltage and a third biasing voltage regulated in such a manner that said first branch current is roughly equal to the difference between the amount of said main current and the amount of said second branch current.

17. The read-out circuit as set forth in claim 14, in which said first constant voltage source and said second constant voltage source generate a ground voltage and a positive voltage, respectively, and said first bipolar transistor, said second bipolar transistor and said third bipolar transistor are the npn type, pnp type and npn type, respectively.

* * * * *